US011401988B2

(12) United States Patent
Bondoux

(10) Patent No.: US 11,401,988 B2
(45) Date of Patent: Aug. 2, 2022

(54) DUAL ACTION MAGNETIC BRAKES AND RELATED METHODS

(71) Applicant: LORD Corporation, Cary, NC (US)

(72) Inventor: Alexandre Bondoux, Erie, PA (US)

(73) Assignee: LORD Corporation, Cary, NC (US)

(*) Notice: Subject to any disclaimer, the term of this patent is extended or adjusted under 35 U.S.C. 154(b) by 100 days.

(21) Appl. No.: 16/646,285

(22) PCT Filed: Sep. 13, 2018

(86) PCT No.: PCT/US2018/050864
§ 371 (c)(1),
(2) Date: Mar. 11, 2020

(87) PCT Pub. No.: WO2019/055644
PCT Pub. Date: Mar. 21, 2019

(65) Prior Publication Data
US 2020/0284308 A1 Sep. 10, 2020

Related U.S. Application Data

(60) Provisional application No. 62/559,204, filed on Sep. 15, 2017.

(51) Int. Cl.
*F16D 49/10* (2006.01)
*F16D 65/06* (2006.01)
(Continued)

(52) U.S. Cl.
CPC ............ *F16D 49/10* (2013.01); *F16D 65/065* (2013.01); *F16D 65/08* (2013.01); *F16D 13/12* (2013.01); *F16D 13/14* (2013.01); *F16D 2121/20* (2013.01)

(58) Field of Classification Search
CPC ........ F16D 13/14; F16D 13/16; F16D 27/102; F16D 27/105; F16D 2027/007;
(Continued)

(56) References Cited

U.S. PATENT DOCUMENTS 2,052,846 A * 9/1936 Ryba ................. F16D 49/08
188/164
4,271,948 A * 6/1981 Yew ................. F16D 27/025
192/84.8

(Continued)

FOREIGN PATENT DOCUMENTS

DE 102005022457 A1 * 11/2006 ........... F16D 27/102
JP 63057926 A * 3/1988 ........... F16D 27/105
(Continued)

OTHER PUBLICATIONS

Dialog translation, JP 63057926 A. (Year: 1988).*
International Search Report and Written Opinion for Application No. PCT/US2018/050864 dated Jan. 30, 2019.

*Primary Examiner* — Thomas J Williams
(74) *Attorney, Agent, or Firm* — Jenkins, Wilson, Taylor & Hunt, P.A.

(57) ABSTRACT

Dual action magnetic brakes and related methods are provided. In one aspect, such a brake includes a housing, a rotatable shaft extending through the housing, and a braking assembly in the housing. The braking assembly includes a coil and a braking member. The coil can generate a magnetic field when energized with electrical current. The braking member, and one or more flexible members attached thereto, can move in response to the presence or absence of the magnetic field to facilitate rotation or non-rotation of the shaft.

17 Claims, 13 Drawing Sheets

(51) Int. Cl.
*F16D 65/08* (2006.01)
*F16D 13/12* (2006.01)
*F16D 13/14* (2006.01)
*F16D 121/20* (2012.01)

(58) Field of Classification Search
CPC .......... F16D 49/08; F16D 49/10; F16D 51/04;
F16D 65/065; F16D 65/06; F16D 65/08
USPC ............................ 188/77 R, 77 W; 192/17 R
See application file for complete search history.

(56) References Cited

U.S. PATENT DOCUMENTS

| | | | |
|---|---|---|---|
| 6,047,805 A * | 4/2000 | Nyquist | ................ F16D 27/105 |
| | | | 192/81 C |
| 6,112,863 A | 9/2000 | Colletti | |
| 6,488,133 B1 * | 12/2002 | Maurice | ................ F16D 27/105 |
| | | | 192/12 BA |
| 2011/0000751 A1 | 1/2011 | Carlson et al. | |
| 2018/0195563 A1 * | 7/2018 | Barbulescu | ............. F16D 49/08 |

FOREIGN PATENT DOCUMENTS

| | | | | |
|---|---|---|---|---|
| WO | WO-2005095819 A1 * | 10/2005 | | .............. F16F 7/082 |
| WO | WO 2017/015464 A1 | 1/2017 | | |

\* cited by examiner

DUAL ACTION MAGNETIC BRAKES AND RELATED METHODS

CROSS-REFERENCE TO RELATED APPLICATION

This application CLAIMS the benefit of U.S. Provisional Patent Application Ser. No. 62/559,204, which was filed on Sep. 15, 2017, the disclosure of which is incorporated herein by reference in its entirety

TECHNICAL FIELD

The present invention relates to brakes and, more particularly, to dual action magnetic brakes and related methods.

BACKGROUND

Existing brakes, in general, utilize frictional components such as pads or plates to slow or stop a rotating part. The frictional components create wear and generate heat. Thus, existing brake systems have short, limited lifetimes.

Additionally, clutch-type brakes utilize motion coupled wear surfaces or drag components to transmit torque. The wear surfaces or drag components couple increased friction at interfaces between drive and driven parts. The increased friction leads to clutch brake systems having shorter, limited lifetimes in which special materials, such as specialized anti-wear lubricants, become necessary.

Accordingly, a need exists for improved brakes and braking methods. Such brakes advantageously exhibit longer lifetimes due to less wear and heat degradation.

SUMMARY

In accordance with this disclosure, dual action magnetic brakes and related methods are provided. Such brakes are referred to as being "dual action," by the brakes being configured to provide meaningful actions in both the "on" and "off" states. In some embodiments, a dual action magnetic brake includes a rotatable shaft, a coil disposed around portions of the shaft, the coil being configured to generate a magnetic field when energized with electrical current, and a braking member disposed proximate to the coil and coupled to the rotatable shaft for rotation together, wherein portions of the braking member are coupled via one or more flexible members. In this configuration, the braking member and the one or more flexible members are moveable in response to the presence or absence of the magnetic field to facilitate rotation or non-rotation of the shaft.

In some embodiments, in the "off" state, the coil is deactivated or off such that no electrical current is supplied thereto, and the shaft rotates at a speed determined by an engine or other drive shaft for transmitting torque to drive a working implement, such as an impeller driving a pump, a fan, a compressor, a transmission, an alternator, a drill, etc., or combinations or portions thereof. Further, and in some embodiments, in the "on" state, the coil is on and activated with electrical current to generate a magnetic field. The braking member moves in response to the magnetic field generated by the coil, and applies a braking force to the shaft to inhibit rotation of the working implement. Thus, in the off-state the rotating shaft rotates and in the on-state the rotating shaft comes to a stop.

Moreover, electrically powering the brake "on" applies a braking force to the rotating shaft for inhibiting rotation of the working implement attached thereto, whereas in the absence of electrical power, the working implement performs its intended function. Thus, the braking devices and methods described herein advantageously conserve electrical power as power may only be required to stop rotation of the working implement. The dual action brakes further facilitate implementation of fail-safe devices, as the work being performed by the working implement is not interrupted by a power failure.

In further aspects, the dual action magnetic brakes and related methods described herein utilize simpler, more efficient designs having fewer components or parts, which improves the ability and efficiency at which rotating parts can be stopped and held. The dual action magnetic brakes can instantaneously or substantially instantaneously stop a rotating shaft without having to implement a spin-down procedure via increasing bearing friction. Thus, the braking devices and methods described herein facilitate faster, more efficient braking.

The brakes described herein may also exhibit longer lifetimes due to less wear between the rotating components within the brake. There is also less wear between the drive and driven components in clutch-type brakes, which are also referred to herein as clutch brakes. Further, the brakes described herein exhibit an improved ease of manufacture by the more efficient and simpler design.

In some embodiments, the braking member moves via radially contracting in the presence of the magnetic field and radially expanding in absence of the magnetic field generated by the coil. In some embodiments, in the presence of the magnetic field, the braking member moves towards the coil. In some embodiments, the braking member substantially surrounds an outer perimeter of the coil such that the braking member moves inwardly towards the center of the coil in response to the presence of the magnetic field. Alternatively, in some embodiments, the coil substantially surrounds an outer perimeter of the braking member such that the braking member will move outwardly towards an inner diameter defined by the coil.

Further, the one or more flexible members attached to the braking member is compressed in the presence of the magnetic field and be decompressed in the absence of the magnetic field generated by the coil. In some embodiments, the flexible members compresses when the coil is "on" by the magnetic field-induced movement of the braking member. Conversely, when the coil is off, the braking member is not induced to move towards the coil, and the flexible members can assume an energetically favorable state or position, such as a decompressed state or elongated position. The flexible members decompress to mechanically induce the braking member to move in a direction opposite the magnetic field-induced movement. In some embodiments, the shaft is rotatable when the flexible members are decompressed and non-rotatable when the flexible members compressed.

Moreover, and in certain instances, the braking member is positioned directly adjacent to the coil and/or a bobbin supporting the coil. A coating, layer, shim, or other friction reducing member can optionally be disposed between the coil and braking member for reducing friction and wear therebetween. The dual action brakes can further comprise optional bearing assemblies to reduce friction and wear between the various rotating and non-rotating parts.

In further embodiments, the braking member is a band that comprises one or more band portions that are positioned about the shaft in an annular arrangement in which the first end of one of the one or more band portions is spaced apart from the second end of one of the one or more band portions by a gap. In some embodiments, a plurality of flexible members extend across/traverse each gap disposed between a first end of one of the one or more band portions and an opposing second end an adjacent one of the one or more band portions. In certain cases, the flexible members are stiffer than the band such that, in the absence of the magnetic field, the flexible members are biased in an energetically favorable state or position, such as in a decompressed state, which forces the opposing ends of the band apart and enlarges the gap between the ends of the band. Expanding the gap permits radial expansion of the band whereas decreasing the gap permits radial contraction of the band.

Still further, and in some embodiments, the brakes described herein comprise clutch brakes. In the clutch brake, the rotatable shaft is a first, driven shaft that is disposed end-to-end relative to a second, drive shaft within the housing. The driven and drive shafts are configured to co-rotate in the absence of the magnetic field. Conversely, the driven shaft can be held stationary in the presence of the magnetic field.

In a further aspect, methods of stopping or slowing rotation of a shaft via application of a braking force to the shaft are also disclosed. In an exemplary embodiment, such a method comprises extending a rotatable shaft through a housing and disposing a braking member on, over, or in the housing around portions of the shaft. In some embodiments, portions of the braking member are coupled via one or more flexible members that are biased in a decompressed state. The exemplary method further comprises disposing a coil adjacent to the braking member, rotating the shaft when the flexible members are in the decompressed state, and energizing the coil with electrical current to generate a magnetic field. The braking member moves in response to the presence of the magnetic field, which compresses the flexible members. As the braking member moves, the shaft ceases to rotate.

In some embodiments, the method further comprises, in response to energizing the coil, moving the braking member towards the coil. In cases where the coil is disposed around the outer circumference or perimeter of the braking member, the braking member radially expands. Alternatively, in cases where the braking member is disposed around the outer circumference or perimeter of the coil, the braking member radially contracts. The coil and braking member are coaxial within the housing, in some embodiments.

Additionally, the exemplary method of applying a braking force to a shaft further comprises disposing a drive shaft adjacent to the rotatable shaft in the housing and co-rotating the shafts when the flexible members are in the decompressed state.

These and other embodiments are described in more detail in the detailed description which follows.

DETAILED DESCRIPTION

Figure 1:
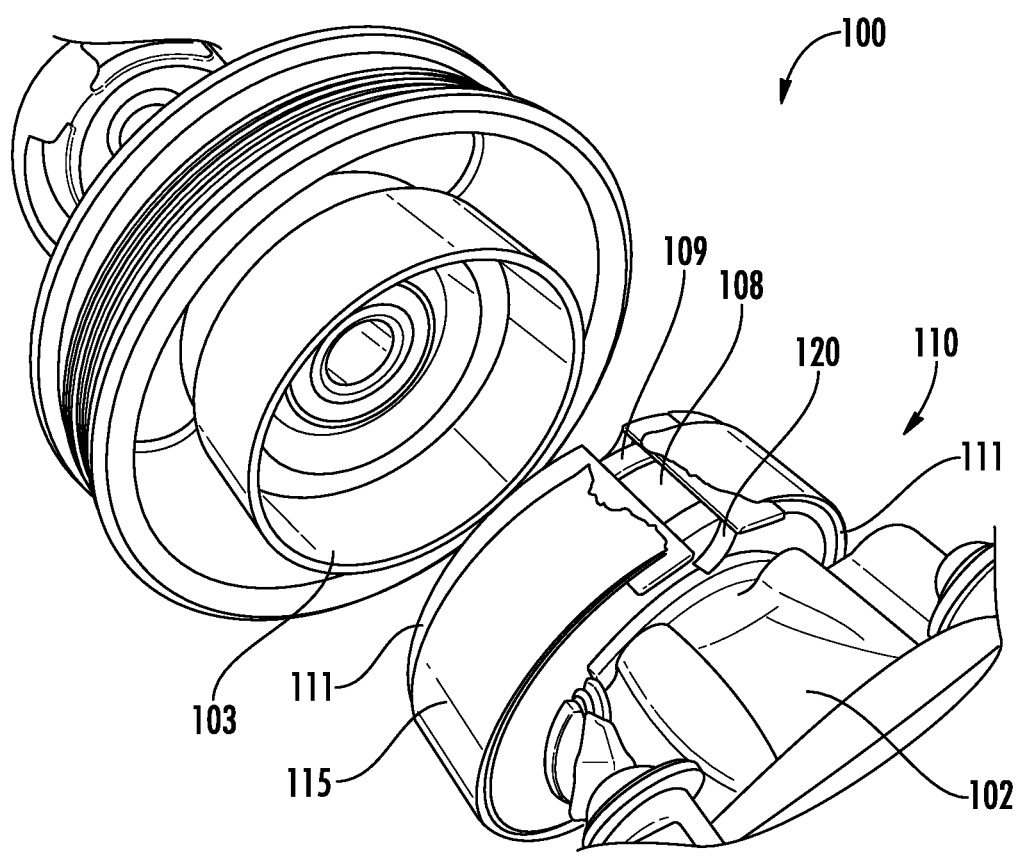
FIG. 1 is a partially exploded side perspective view of a dual action magnetic brake according to an embodiment of the presently disclosed subject matter.

It is understood that the dual action magnetic brake devices, features, and methods described herein are not limited to the specific embodiments presented in the detailed description and drawings. It is recognized that these embodiments are merely illustrative of the principles of the instant subject matter. Numerous modifications and adaptations will be readily apparent to those of skill in the art without departing from the subject matter disclosed herein.

I. Dual Action Magnetic Brakes

Dual action magnetic brakes are disclosed. Briefly, such a brake comprises, consists, or consists essentially of at least one rotatable shaft, an electromagnetic element, such as a coil, and a braking member disposed proximate to the electromagnetic element. In some embodiments, the brake includes a housing, wherein the shaft is at least partially disposed through the housing, the braking member is disposed in the housing, and the electromagnetic element is disposed on, over, or in the housing. The electromagnetic element is optionally positioned around portions of the shaft and adjacent to the braking member. The electromagnetic element is configured to generate a magnetic field when energized with electrical current. The braking member is configured to move in response to the presence or absence of the magnetic field to facilitate rotation and non-rotation of the shaft. In some embodiments, the braking member moves towards the electromagnetic element when the electromagnetic element is powered on for stopping rotation of the at least one rotatable shaft.

In some embodiments, the braking member includes a brake band that is disposed around the circumference or outer perimeter of the electromagnetic element and is coupled to the rotatable shaft for rotation together. Alternatively, in other embodiments, the electromagnetic element is disposed around the circumference or outer perimeter of the band. In either configuration, when the electromagnetic element is turned to an "on" state such that a magnetic field is developed, the braking member correspondingly either radially contracts or expands towards the electromagnetic element depending on the arrangement of the components. As the braking member moves towards the electromagnetic element, the magnetic field acts to hold the braking member in a non-rotating, stationary or substantially stationary position with respect to the electromagnetic element. Since the braking member is coupled to the shaft for rotation together, holding the braking member in place in this way applies a braking force to the shaft for correspondingly inhibiting rotation of the shaft. Conversely, when the electromagnetic element is turned to an "off" state such that the magnetic field is removed, the braking member is released from its magnetic engagement with the electromagnetic element, thereby enabling rotation of the shaft. In this configuration, braking force is not applied to the shaft in the absence of the magnetic field. In some embodiments, the shaft is configured to transmit torque to a working implement to rotate the implement, such as, for example, and without limitation a fan, pump, compressor, transmission, alternator, drill, etc., or portions or combinations thereof, and thus the ability of the present system to stop the rotation of the shaft can be used to help control the operation of working implement.

In some embodiments, the braking member is disposed adjacent to or otherwise proximate to the electromagnetic element. In some embodiments, the electromagnetic element includes an annular coil that is wrapped or wound around a bobbin core that supports the annular coil and coil windings. In some configurations in which the electromagnetic element is disposed around the braking member, the coil optionally contacts external portions or surfaces of the braking member. Alternatively, in some embodiments in which the braking member is disposed around the electromagnetic element, the coil is disposed adjacent to and optionally contact internal portions or surfaces of the braking member. In any configuration, the braking member can be disposed directly adjacent to the coil, or one or more intervening layers, materials, or components can be disposed between the braking member and the coil.

In some embodiments, the braking member is disposed proximate to the bobbin supporting the annular coil and coil windings. In some embodiments, the bobbin and braking member each comprise a ferromagnetic material such that when the coil is powered on, the braking member is attracted to the bobbin, and vice versa. When the coil is activated, the braking member and bobbin can optionally come into physical contact. When the coil is not activated, the braking member may move away from the coil and not contact the bobbin.

In some embodiments, the braking member comprises a substantially ring-shaped band with one or more gaps between portions of the braking member, and one or more flexible members extend across a gap and couple opposing ends of the braking member. In this arrangement, movement of the portions to expand or narrow the one or more gaps changes the effective diameter of the braking member, and the one or more flexible members bias this adjustable diameter towards a desired relaxed diameter. The one or more flexible members also move in response to the presence or absence of the magnetic field by moving in response to the field-induced movement of the braking member. In some embodiments where the braking member is disposed outside of the coil, the one or more flexible member is configured to be compressible when the brake is powered "on" to allow for the field-induced radial contraction of the braking member to inhibit rotation of the shaft. Conversely, when the brake is powered "off", the one or more flexible members are biased in the energetically favorable decompressed or relaxed state, which promotes radial expansion of the braking member and rotation of the shaft.

In alternative embodiments where the coil is disposed outside of the braking member, the one or more flexible member is configured to expand when the coil is "on" to allow for the field-induced radial expansion of the braking member to stop rotation of the shaft. Conversely, when the brake is powered "off", the one or more flexible members are biased in the energetically favorable decompressed or relaxed state to promote radial contraction of the braking member and allow rotation of the shaft.

In some embodiments, the flexible members have a stiffness that is selected to apply a biasing force to the braking member to encourage the braking member to either radially expand or contract to create separation from the electromagnetic element and thereby actively disengage the braking member from the electromagnetic element. In some embodiments, this biasing force is applied in combination with the stiffness of the braking member itself. The one or more flexible members can advantageously improve the degree or amount by which the braking member expands or contracts, which reduces wear due to incomplete or partial disengagement of the braking member. The flexible members can comprise or consist of, for example, elastomers, elastomeric materials, metallic materials, non-metallic materials, rubber, silicone, plastic, or foam. In some embodiments, the flexible members comprise biasing members such as springs, clips, hinges, or the like. In some embodiments, the flexible members apply a force of about 5-10 times the natural stiffness of the braking member, which can be a band, pad, plate, clip, etc. The mechanically-induced movement of the braking member via forces exerted by the flexible members can vary, for example, and be scaled up or scaled down, as desired, for use in various applications not inconsistent with the instant subject matter. In some embodiments, the flexible members apply a force of about one (1) to about fifty (50) times the natural stiffness of the braking member, where desired, to achieve a desired result.

FIGS. 1 to 8D illustrate various views, embodiments, and/or aspects associated with dual action magnetic brakes and related methods as described herein. Referring now to FIG. 1, a dual action magnetic brake, generally designated 100, is shown. The brake 100 comprises, consists, and/or consists essentially of a housing 102, a rotatable shaft 104 that extends partially through the housing, an electromagnetic element in the form of a coil 108 that is disposed on or over the housing, and a braking member 110 that is coupled to the shaft for rotation together and is selectively engageable with the coil 108. In the illustrated embodiment, the braking member 110 includes a substantially ring-shaped band 111 comprising one or more band portions that are positioned about the shaft 104 in an annular arrangement in which the first end of one of the one or more band portions is spaced apart from the second end of an adjacent one of the one or more band portions by a gap 112. In the embodiments illustrated in FIGS. 1 to 8D, the band 111 represents a single band portion having a gap 112 formed at one position along its circumference. As will be discussed below, however, in other embodiments, the braking member 110 includes a plurality of partial band portions that are coupled together across a plurality of gaps.

In some embodiments, the portions are joined, attached, or coupled via one or more flexible members 120 that extend across each gap 112. Flexible members 120 are springs, spring steel, or other compressible members. The coil 108 is configured to generate a magnetic field when energized with electrical current. As described in more detail below and illustrated in FIGS. 1 and 2A, the braking member 110 is configured to move in response to the presence or absence of the magnetic field generated by the coil 108 for facilitating non-rotation and rotation of the rotatable shaft 104 extending through the housing 102. In some embodiments, the braking member 110 moves towards the coil 108 in the presence of the magnetic field, as the magnetic field may magnetically attract the braking member 110.

The housing 102 can comprise or be formed from any suitable size, shape, and/or body of material not inconsistent with the instant disclosure. The housing 102 is configured to support and partially enclose or house the various brake 100 components—including magnetic and non-magnetic brake components—for rotating and/or braking a working system or component as described herein. In some embodiments, the housing comprises an external and internal frame for supporting various portions of the braking assembly on, over, or in the frame. In some embodiments, the housing comprises an internal frame for statically supporting the stationary coil inside or outside of the braking member. In some embodiments, the housing 102 comprises metal and is formed from a metallic material. Alternatively, the housing 102 can be non-metallic, for example, and comprise plastic, ceramic, or any other non-metallic material, where desired.

Any size and/or shape of housing 102 can be provided for fully or partially enclosing the dual action brakes described herein. In some embodiments, rounded, curved, cylindrical, or substantially circular or annular shaped housings 102 can be provided. Alternatively, non-rounded, non-curved, non-cylindrical or non-circular shaped housings 102 can also be provided. Such housings can comprise, for example, cubic or square shaped housings, linear walled housings, or the like.

As FIG. 1 illustrates, a rounded housing 102 is provided to efficiently house and support a bobbin 109 and the stationary coil 108 internally, within an internal chamber defined in the housing 102. In some embodiments, the bobbin 109 comprises or is formed from a body of ferromagnetic material for supporting the coil 108. When the coil 108 is on, the magnetic field generated by the coil magnetically attracts the braking member 110 towards the bobbin 109 and facilitates magnetic field-induced movement of the braking member. The bobbin 109 and coil 108 are held stationary within the housing 102, in some embodiments. Holding the coil 108 stationary obviates the need for slip rings and/or brushes.

In some further embodiments, the housing 102 comprises a width or diameter in one, two, or three dimensions of at least about 0.5 inch (in.)/12.7 millimeters (mm), 1 in./25.4 mm, 2 in./50.8 mm, 3 in./76.2 mm, 4 in./101.6 mm, 6 in./152.4 mm, or greater than 6 in./152.4 mm. In some cases, the housing 102 comprises a width or diameter in one, two, or three dimensions ranging from about 0.5 in./12.7 mm-20 feet (ft.)/6.1 meters (m), or any subrange thereof, such as 1-4 in./25.4-101.6 mm, 2-6 in./50.8-152.4 mm, 4-8 in./101.6-203.2 mm, 12-24 in./304.8-609.6 mm, 1-60 in./25.4-1524 mm, 2-12 ft./0.61-3.66 m, 1-15 ft./0.3-4.57 m, etc. In some embodiments, the housing 102 comprises a compact size, shape, or footprint that is slightly larger in diameter than the coil 108 and/or braking member 110 for compactly housing the braking assembly. In some embodiments, the housing 102 comprises a width or diameter that is about 0.5 millimeters (mm)-6 in. greater than the width or diameter of the braking member 110, or any value therebetween. One or more optional layers of material may be positioned in the gap between the housing 102 and the braking member 110, where desired, for reducing wear.

In some embodiments, and as FIG. 1 further illustrates, in some instances the braking member 110 is at least partially disposed in coating or layer of material 115. In some embodiments, the layer of material 115 comprises a material that is optimized for wear or friction reducing properties. In some embodiments, the layer of material 115 is configured to enlarge and/or fill the gap between the braking member 110 and the housing 102 for reducing wear as the braking member enlarges 110. The layer of material 115 can comprise a metallic material, a non-metallic material, plastic, adhesive, shims, and/or any other type of non-magnetic material and/or member not inconsistent with the instant disclosure.

Figure 2A:
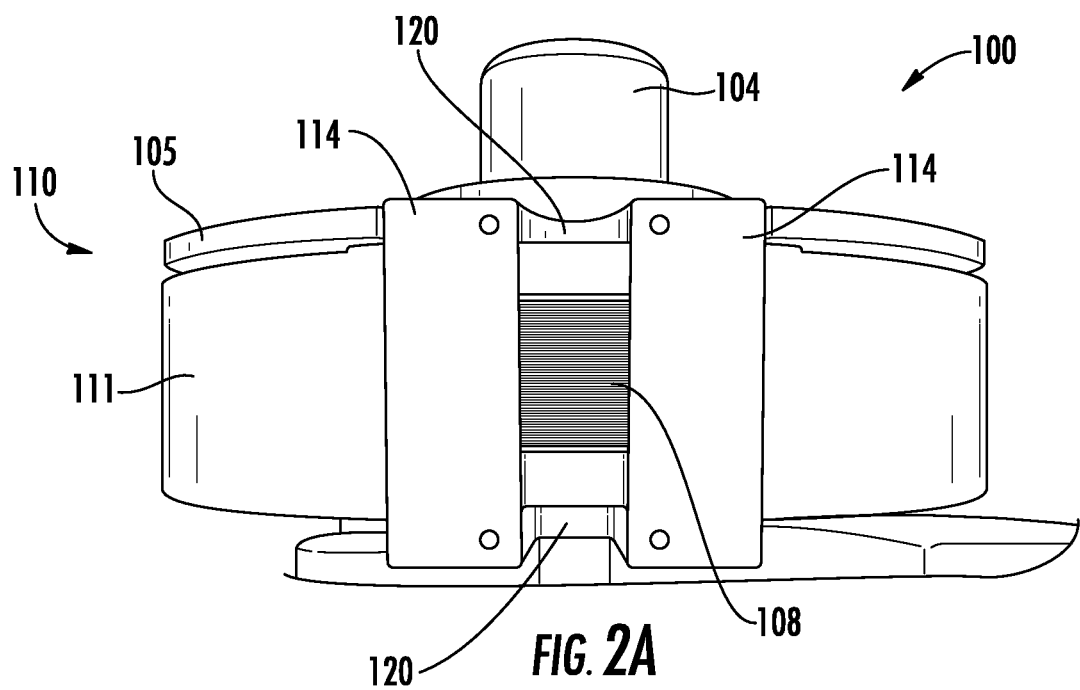
FIGS. 2A-2C are side perspective views of elements of a dual action magnetic brake according to an embodiment of the presently disclosed subject matter.
Figure 2B:
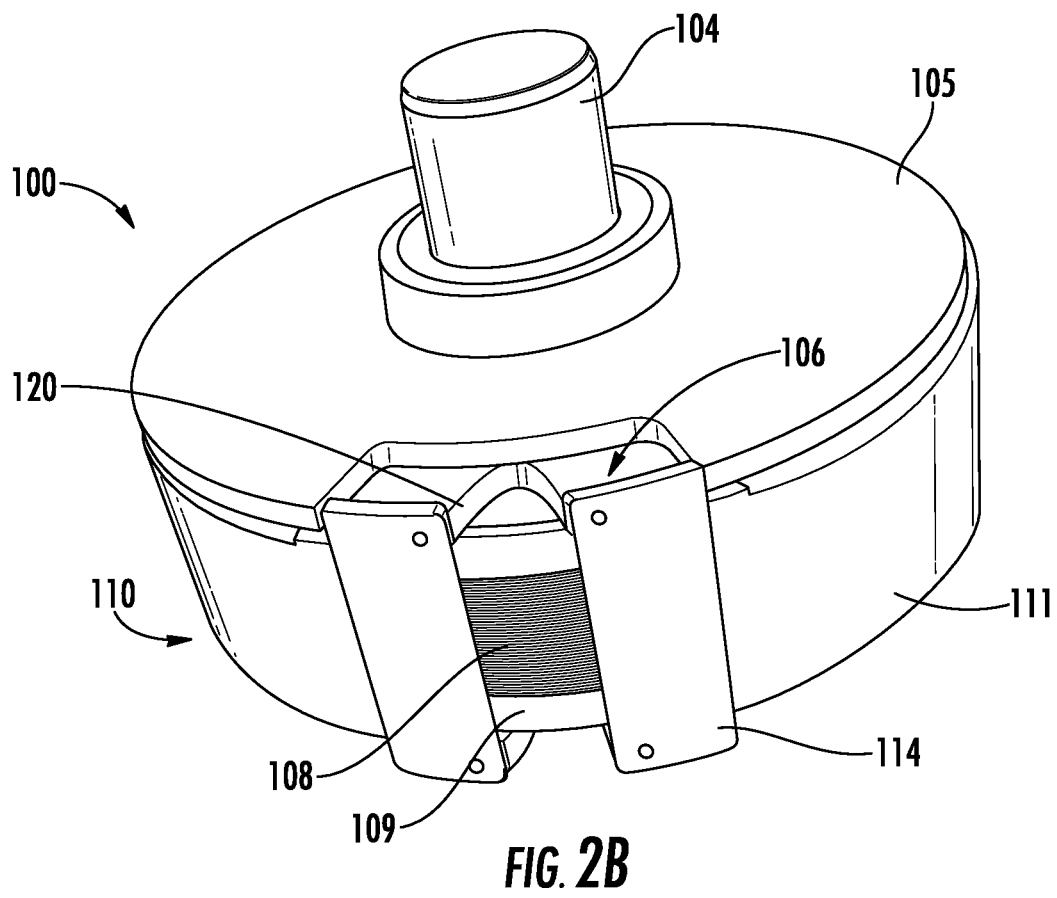
Figure 2C:
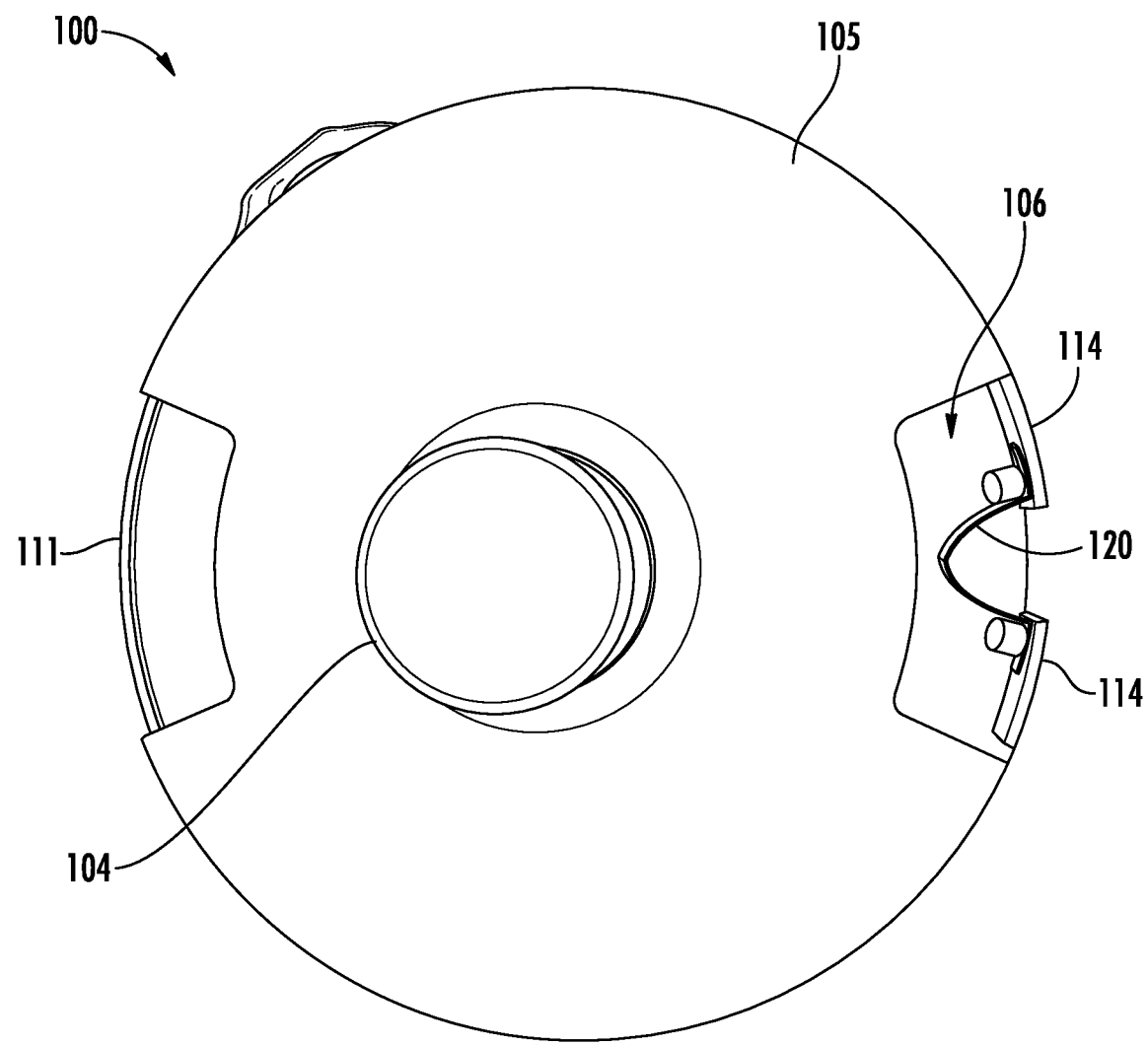

FIGS. 2A-2C are different views of elements of the brake 100. In these Figures, and for visibility purposes only, the external enclosure of the housing 102 is not shown. Referring in general to FIGS. 2A-2C, the rotatable shaft 104 partially extends through portions of the braking assembly comprised of the electromagnetic coil 108 and the braking member 110. Portions of the shaft 104 also extend externally from the braking assembly for driving a working implement. The rotatable shaft 104 is configured to transmit torque to the working implement, such as a pump, fan, etc., to drive the working implement when the coil 108 is in the off-state and hold the working implement stationary when the coil 108 is in the on-state.

In some embodiments, the shaft 104 is coupled to a disc 105. In the off-state, the shaft 104 is configured to rotate via torque transferred thereto via the disc 105. Conversely, and in the on-state, the shaft 104 is held stationary by the disc 105 being held stationary via the braking member 110 and/or the flexible members 120. In some embodiments, the braking member 110 and/or flexible members 120 apply a braking force to the shaft 104 for preventing rotation of the shaft. The shaft 104 is centrally disposed relative to the disc 105, the coil 108, and/or the braking member 110. Alternatively, shaft 104 is non-centrally disposed relative to the disc 105, the coil 108, and/or the braking member 110.

Referring now to FIGS. 2B-2C, in some embodiments, a pocket, sleeve, recess, slot, groove, or gap 106 is disposed or formed in the disc 105 to accommodate the flexible members 110 of the braking member 108. In addition, in some embodiments, the braking member 108 further includes one or more tab 114 that extends from the terminal ends of the band 111 into the pocket 106. When the coil 108 is in the off-state as seen in FIGS. 2B-2C, the braking member 110 is in an expanded state and the flexible members 120 are biased in an extended, relaxed, and decompressed state, which forces opposing ends of the braking member 110 to move outwards allowing the disc 105 to rotate.

Moreover, when the flexible members 120 are in the relaxed or decompressed state, the tabs 114 extending from the terminal ends of the braking member 110 are forced outwardly and contact, abut, retain, or otherwise frictionally engage opposing edges of the pocket 106. In some embodiments, the braking member 110 expands to a maximum diameter as defined by an enclosure 103 as shown in FIG. 1. In such a configuration, the braking member 110 co-rotates with the disc 105 and shaft 104.

Conversely, when the coil 108 is in the on-state, the braking member 110 is moved to a radially contracted state and the flexible members 120 are compressed, which inhibits rotation of the braking member 110 via frictional engagement with the bobbin 109. In the on-state, the braking member 110 holds the disc 105 stationary via engagement of the tabs 114 with the edges of the pocket 106. The shaft 104 and disc 105 are thereby held stationary via the braking member 110 as it moves inwardly and contracts towards the coil 108 via an attractive magnetic force between the coil 108 and the braking member 110.

Figure 3A:
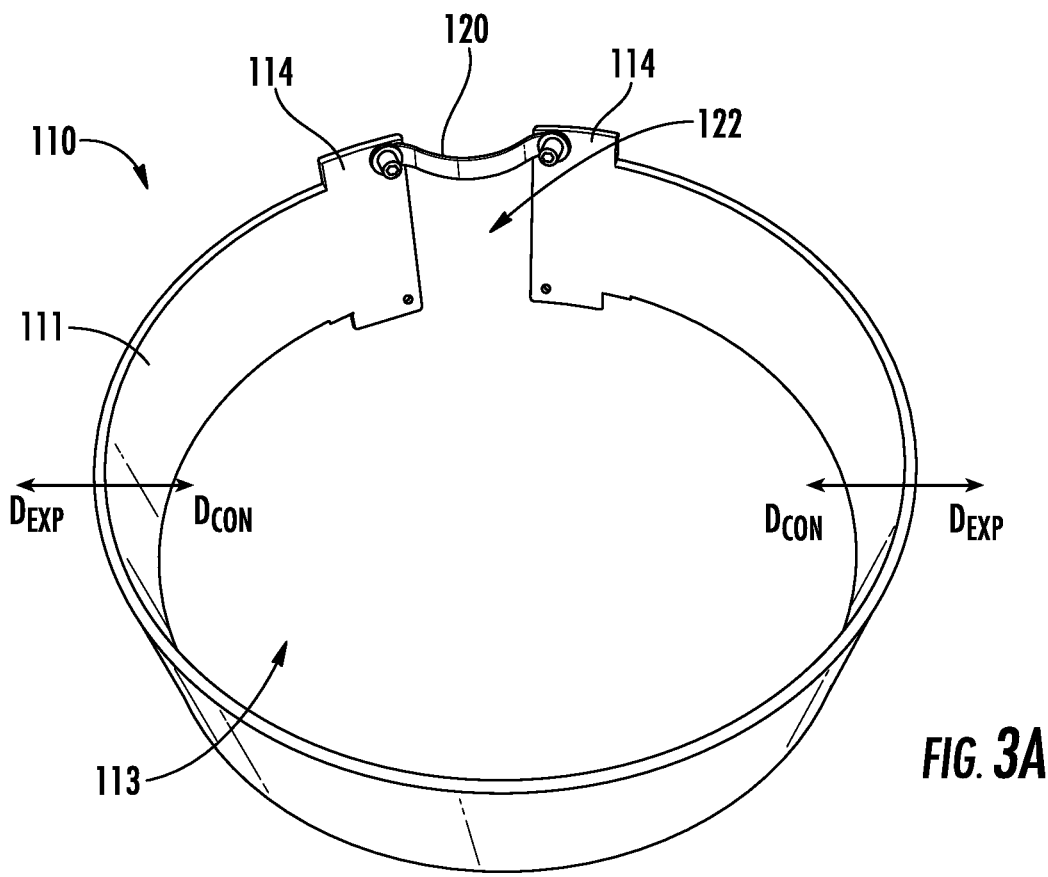
FIGS. 3B and 3C are side perspective views of a braking element of a dual action magnetic brake according to an embodiment of the presently disclosed subject matter.
Figure 3B:
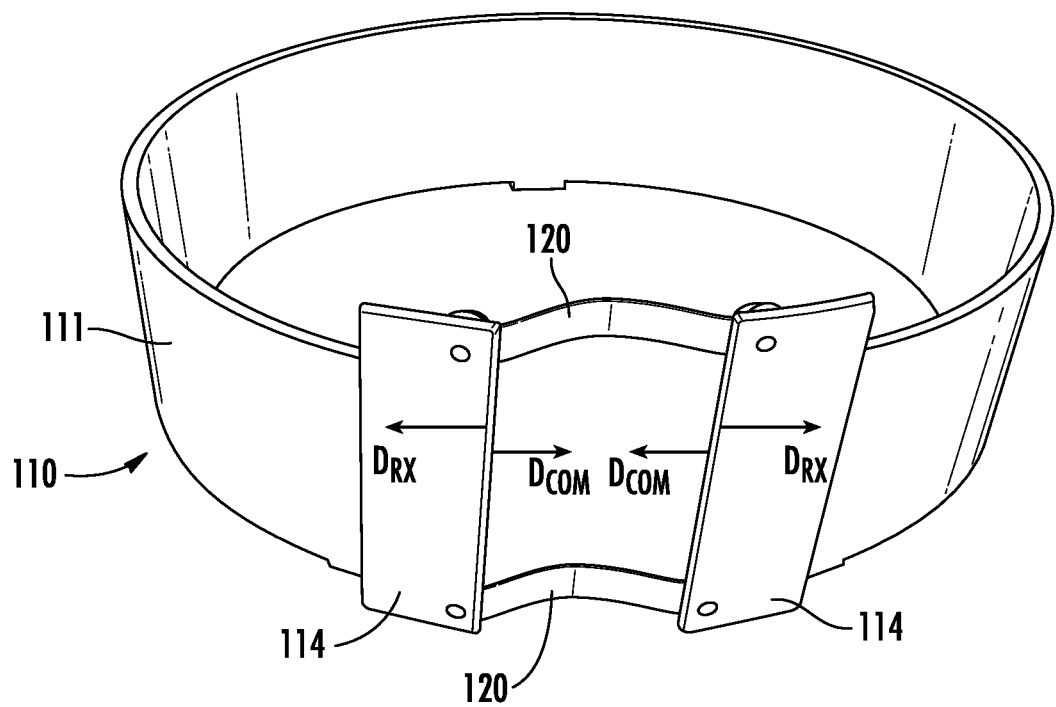

FIGS. 3A-3B are views of the braking member 110, which, in some embodiments, have flexible members 120 attached thereto. In some embodiments, the braking member 110 comprises a substantially annular-shaped band 111 defining an opening or space 113. The rotatable shaft 104, disc 105, bobbin 109, and/or coil 108 can be partially or fully positioned or disposed in portions of the space 113 to allow or inhibit rotation of the shaft and disc. In some embodiments, the flexible members 120 expand across and/or traverse a gap 112 formed between opposing, terminal ends of the braking member 110. In some embodiments, the terminal ends of the braking member 110 are formed as projections or tabs 114. The terminal ends can be forced open via the stiffer flexible members 120 in the absence of the magnetic field, i.e., when the flexible members 120 are in a biased decompressed state or condition. In the biased state, the flexible members 120 allow the braking member 110 to fully disengage from the coil 108 and/or the bobbin 109, which allows the braking member 110, the disc 105, and the shaft 104 to co-rotate for driving a working implement. The dual action brakes described herein can facilitate rotation and braking of any type of working implement, including, without limitation, fans, blades, pumps, compressors, transmissions, drills, or any other type of working implement that operates via rotation not inconsistent with the instant disclosure.

FIGS. 3A-3B further illustrate exemplary movement of the braking member 110 and the flexible members 120 during the on and off-states. Referring to FIG. 3A, and in the on-state, the braking member 110 radially contracts in the direction indicated by the arrow and $D_{CON}$ in response to the presence of the magnetic field generated via the coil 108. In the off-state, the braking member 110 radially expands in the direction $D_{EXP}$ in response to the absence of the magnetic field.

Similarly, as FIG. 3B illustrates, and in some embodiments, the flexible members 120 compress in the direction $D_{COM}$ in response to the presence of the magnetic field. In the off-state, the flexible members 120 are biased to a decompressed or relaxed state as indicated by direction $D_{RX}$. When in the decompressed state, the flexible members 120 can force the terminal ends of the braking member 110 to open up for fully disengaging the braking member 110 from the coil. The shaft 104 is rotatable when the flexible members 120 decompress and non-rotatable when the flexible members 120 compress. Moreover, in the absence of the magnetic field, the flexible members 120 decompress and enlarge the gap 112 between the terminal ends of the braking member 110. Although the action of the flexible members 120 is discussed as having a relaxed state that corresponds to an expanded diameter of the band 111, those having ordinary skill in the art will recognize that, in other embodiments in which braking is achieved by pressing the band 111 outwardly, the flexible members 120 are configured such that they are biased to a relaxed state that draws the terminal ends of the braking member 110 towards each other.

FIGS. 3A-3B depict a plurality of flexible members 120 being attached to the braking member 110, however, in some cases, only one flexible member 120 is attached to the braking member 110. However, any quantity of flexible members 120 can be provided per braking member 110 where desired, not inconsistent with the instant subject matter. In some embodiments, the flexible members 120 are springs, spring steel, or other compressible members.

Figure 4A:
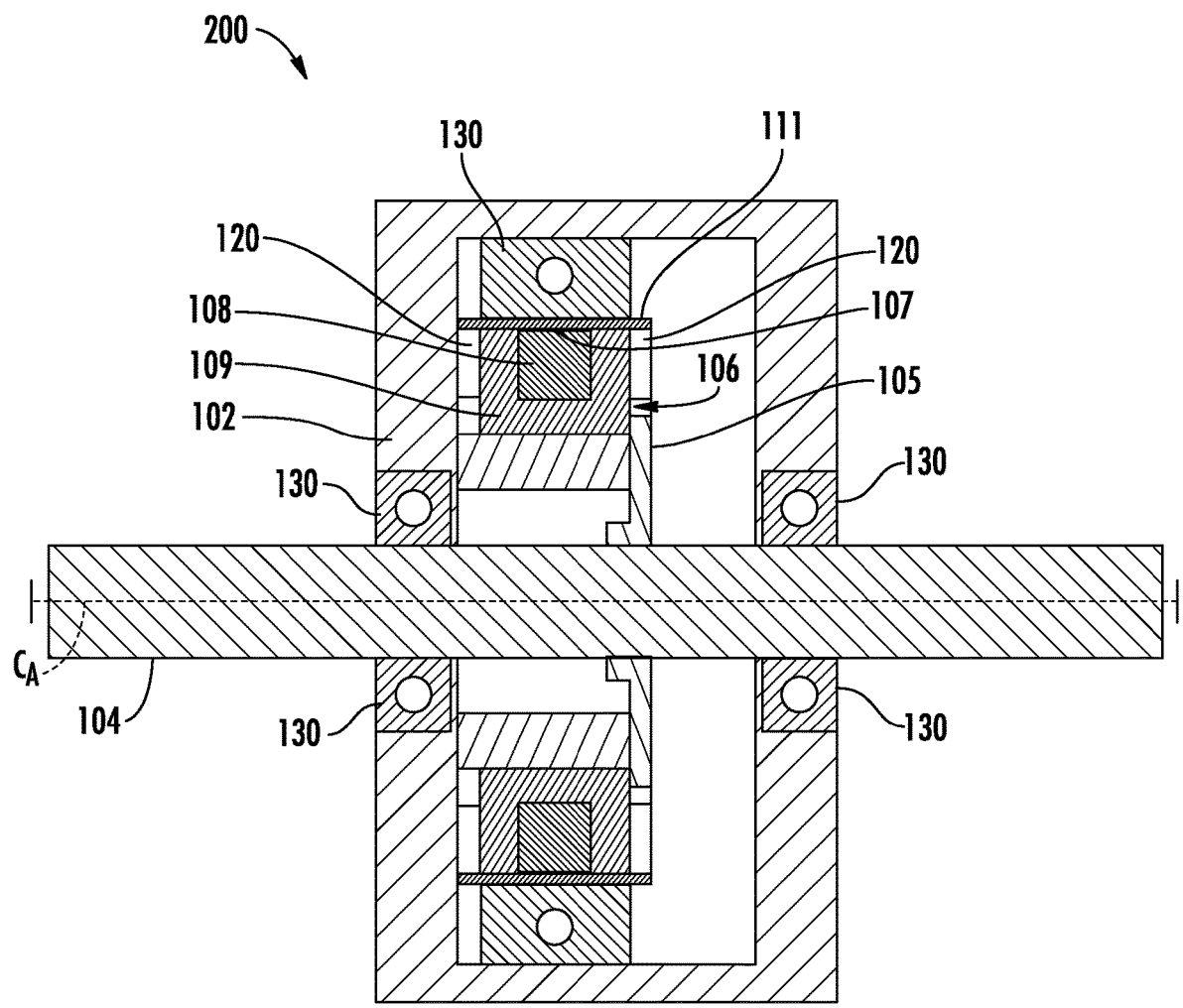
FIGS. 4A-4B are sectional views of a dual action magnetic brake according to embodiments of the presently disclosed subject matter.
Figure 4B:
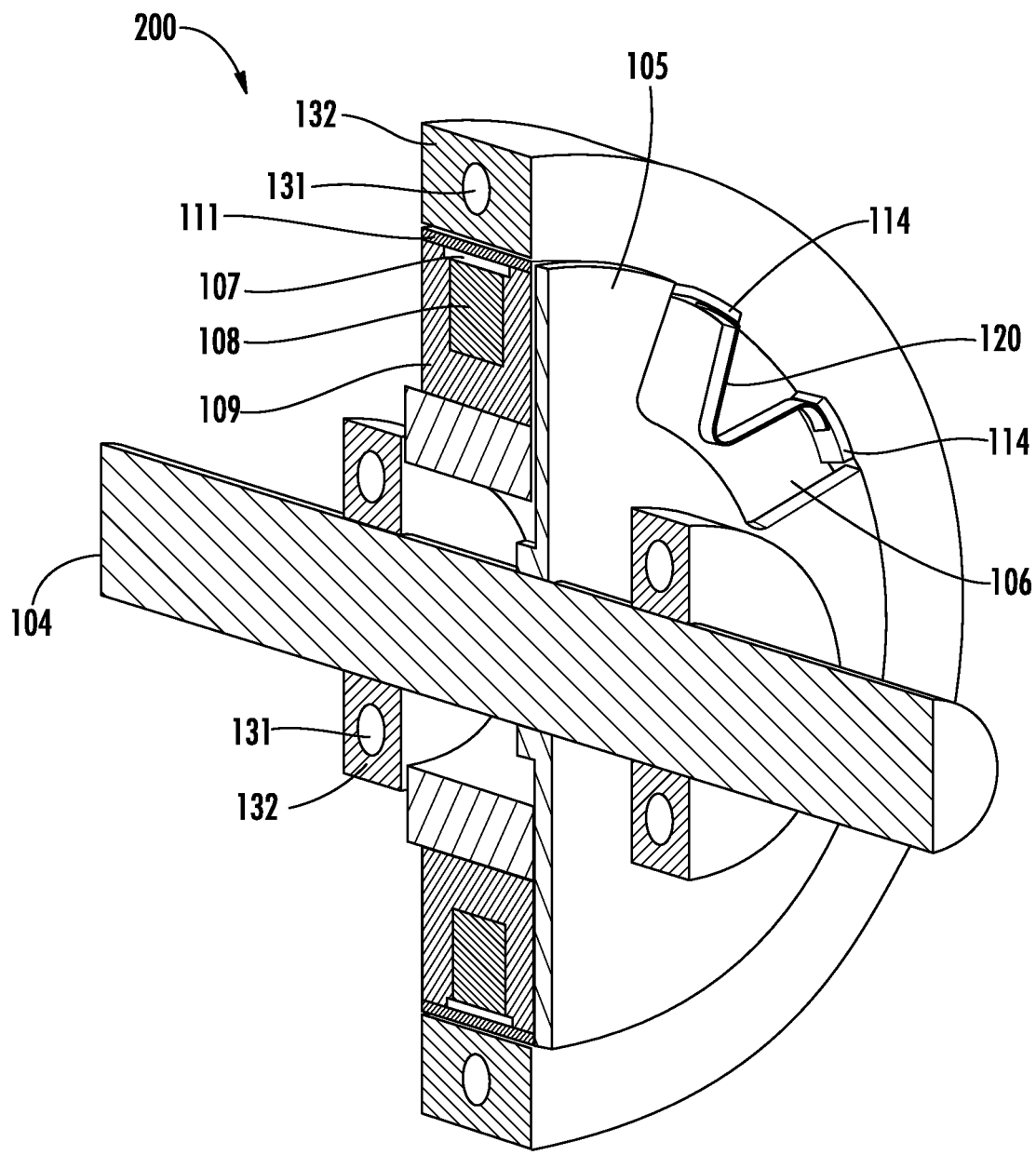

FIGS. 4A-4B schematically illustrate a further embodiment of a dual action magnetic brake, generally designated 200. In this embodiment, the magnetic brake 200 comprises a frame or housing 102, a rotatable shaft 104 partially disposed in the housing, a coil 108 supported in the housing, and a braking member 110 disposed in the housing. The braking member 110 is connected via one or more flexible members 120.

As FIG. 4A illustrates, the coil 108 can be wound around the bobbin 109. In this embodiment, the coil 108 is disposed on an inner surface of the braking member 110, to which the flexible members 120 are attached. Stated differently, the braking member 110 is disposed around the circumference or perimeter of the coil 108. In some embodiments, a sleeve 107 is disposed on or over outer surfaces of the coil 108, where desired, to optimize friction and wear capabilities. The braking member 110 can optionally comprise a band 111 that moves inwardly, towards a central axis CA in the presence of the magnetic field and outwardly, away from the central axis CA in the absence of the magnetic field. The central axis CA is also the axis of rotation, in some embodiments, about which the shaft 104 and respective disc 105 co-rotate. In some embodiments, the disc 105 is fixedly disposed on and/or mounted to the shaft 104.

In some embodiments, one or more bearing assemblies 130 are disposed between rotating portions of the brake 200 and non-rotating portions of the brake 200 to alleviate friction, reduce wear, and improve the ease of rotation. As FIG. 4B illustrates, the bearing assemblies 130 can comprise a plurality of movable bearings, such as needles or balls 131 and a bearing race 132 that supporting the bearings during rotation.

Referring still to FIG. 4B, and in some cases, the flexible members 120 are disposed or positioned in a sleeve or pocket 106 of the disc 105. The shaft 104, disc 105, and braking member 110 co-rotate in the off-state corresponding to the lack of a magnetic field. The shaft 104, disc 105, and braking member 110 can co-rotate in a clockwise (CW) or a counterclockwise (CCW) direction by the engagement of tabs 114 of the braking member 110 with the pocket 106 of the disc 105. In some embodiments, the flexible members 120 are biased in an elongated, extended, relaxed, or otherwise decompressed state. In the decompressed state, the flexible members 120 urge the braking member 110 against the pocket 106 of the disc. Conversely, and in the presence of the magnetic field, the flexible members 120 compress and rotation is inhibited via the radial constriction of the braking member 110 towards and/or against the coil 108. When the coil is on, the braking member 110, disc 105, and shaft 104 are all stopped and held in a stationary, non-rotating state.

Figure 5A:
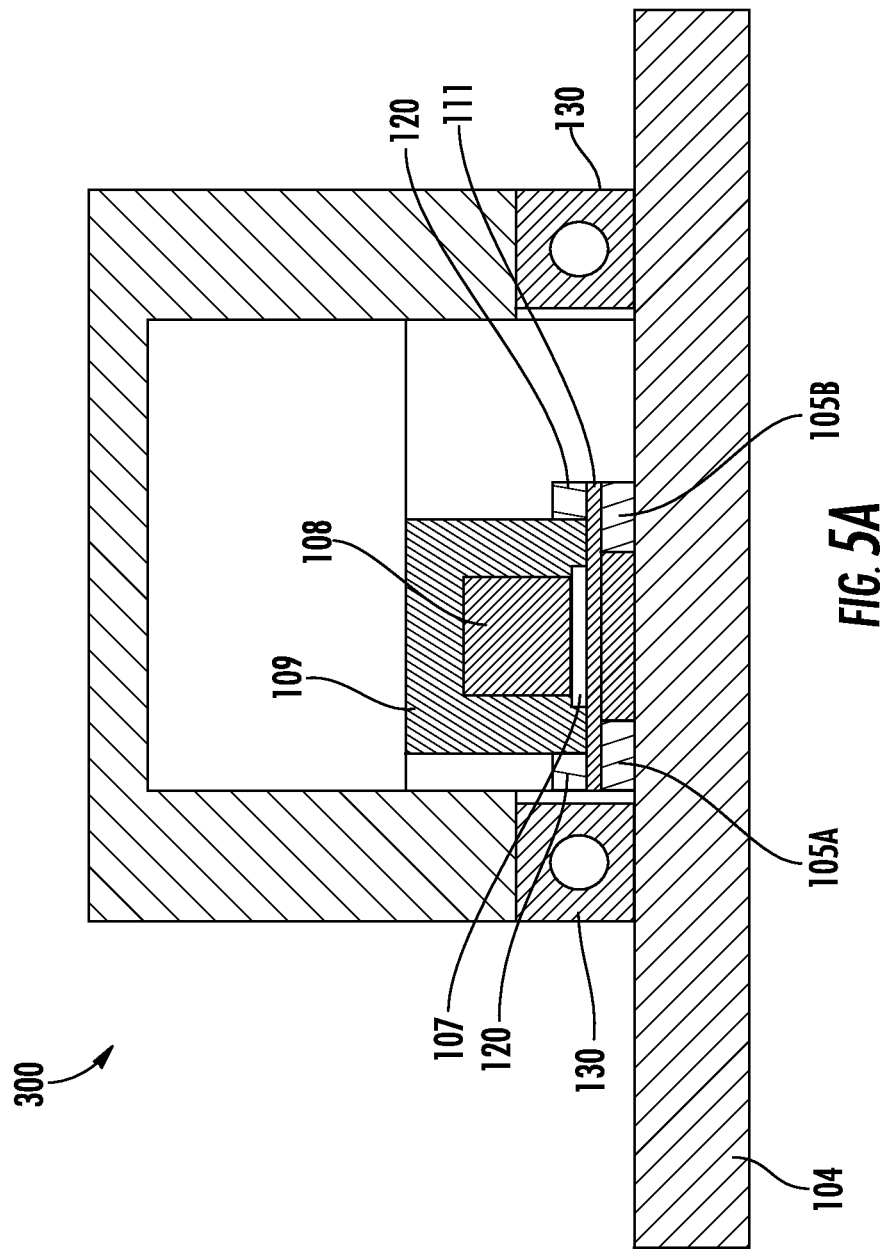
FIGS. 5A-5B are sectional views of a dual action magnetic brake according to embodiments of the presently disclosed subject matter.
Figure 5B:
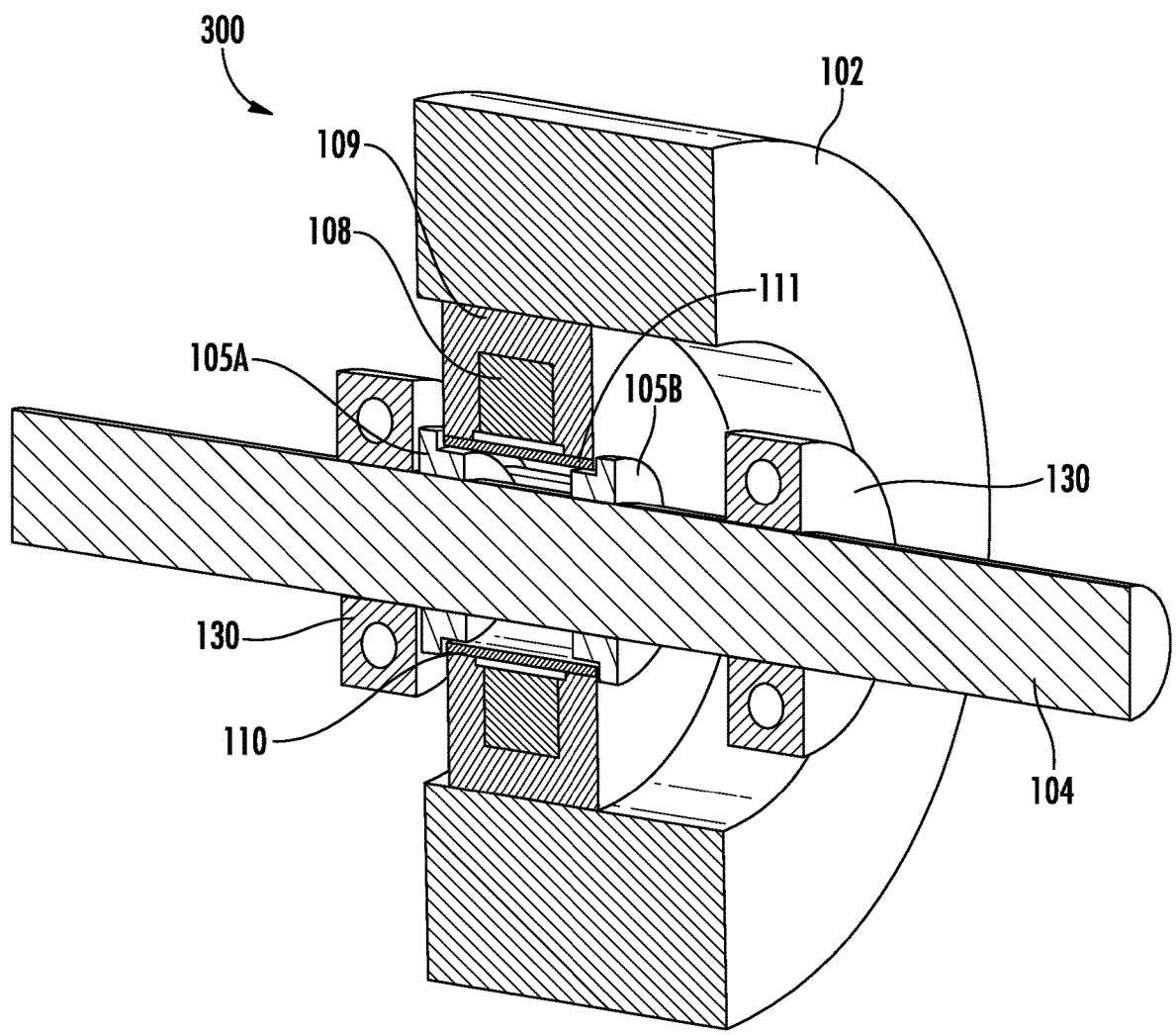

FIGS. 5A-5B illustrate a further embodiment of a dual action magnetic brake, generally designated 300. The dual action brakes described herein transmit torque to a working implement via rotation of the shaft in the off-state and apply a braking torque in the on-state. Stated differently, when the coil is powered on, a braking torque is applied on the shaft. When the coil is powered off, no braking torque is applied to the shaft, which allows the shaft to rotate for rotating a working implement. Since electrical current is not used to transmit torque in the off-state, energy and cost savings can be realized. The brakes described herein are also fail-safe by being operable to power a working implement in the absence of electrical power.

Referring in general to FIGS. 5A-5B, the braking device 300 comprises a frame or housing 102, a shaft 104 extending through the housing, a coil 108, and a braking member 110. Portions of the braking member 110 are coupled and/or attached to flexible members 120. In some embodiments, the coil 108 is wound around a bobbin 109 that is fixedly attached to the frame or housing 102. An optional layer, shim or sleeve 107 of material can be disposed on or over surfaces of the coil 108 to optimize friction and wear capabilities. Further, one or more optional bearing assemblies 130 can be disposed between rotating and non-rotating portions of the brake 300 to further optimize friction and wear capabilities.

In this embodiment, by way of an example, the coil 108 is wound about an oppositely oriented bobbin 109 compared to the previously described embodiments. In this embodiment, the coil 108 is disposed around a circumference or outer perimeter of the braking member 110 such that when the coil 108 is on, the braking member 110 radially expands towards the coil 108 and away from the shaft 104. Conversely, when the coil is off, the braking member 110 radially contracts towards the shaft 104 and away from the coil 108. In this embodiment, the movement of the braking member 110 is opposite or otherwise different than in previously described embodiments by the coil 108 being positioned outside of the braking member 110 as opposed to inside the braking member 110 and by the bobbin 109 being oriented towards and facing the shaft 104 as opposed to being oriented and facing he away from of the shaft 104.

In some embodiments, and in some cases as described earlier, the flexible members 120 are biased in an extended, decompressed state when the coil is off such that the magnetic field is removed. The fixedly disposed, stationary portions of the flexible members 120, which are attached to the braking member 110, face the shaft in this embodiment whereas the stationary portions or "feet" of the flexible members 120 in previous embodiments face the outermost housing. The braking member 110 and flexible members 120 are movable in the presence of a magnetic field; however, such movements can be different than in FIGS. 4A-4B. In this embodiment, the braking member 110 moves away from the coil 108 in the on-state and towards the coil in the off-state.

Still referring to FIGS. 5A-5B, the shaft 104 is attached to multiple shaft discs, such as, for example and without limitation, at least a first shaft disc 105A and a second shaft disc 105B. As FIG. 5B further illustrates, the flexible members 120 are each disposed in one or more pockets, sleeves, recesses, or grooves 106 of the shaft discs. In the decompressed, elongated, and/or relaxed state, the flexible members 120 urge the braking member 110 flush against the grooved portions of the discs 105A and 105B to facilitate and/or allow rotation of the disc and shaft 104 assemblies. In the on-state, the flexible member 120 compresses and the braking member 110 locks against the bobbin 109 to lock and hold the shaft 104 and discs 105A and 105B stationary.

The dual action brakes described herein are operable via generation of any magnitude, polarity, orientation, and/or direction of magnetic field, not inconsistent with the instant subject matter. It is recognized that the figures and embodiments described herein are merely illustrative of the concepts, principles, and/or functionality of the instant subject matter. Numerous modifications and adaptations will be readily apparent to those of skill in the art without departing from the subject matter disclosed herein. In some embodiments, portions of the dual action brakes are integrated or combined, where desired, without deviating from the instant subject matter.

II. Dual Action Magnetic Clutch Brake

In further aspects, dual action magnetic clutch brakes are set forth herein. In some embodiments, such clutch brakes comprise the housings, coils, braking members, and/or flexible members as described in Section I above. In some embodiments, such clutch brakes further comprise a plurality of shafts. At least one shaft is a drive shaft coupled to a mechanical input and at least one other shaft is a driven shaft configured to drive a working implement. In the off-state, the drive and driven shafts co-rotate to drive a working implement. Conversely, and in the on-state, a braking torque is applied to the driven shaft for inhibiting rotation thereof, which in turn inhibits rotation of the working implement attached thereto.

Figure 6:
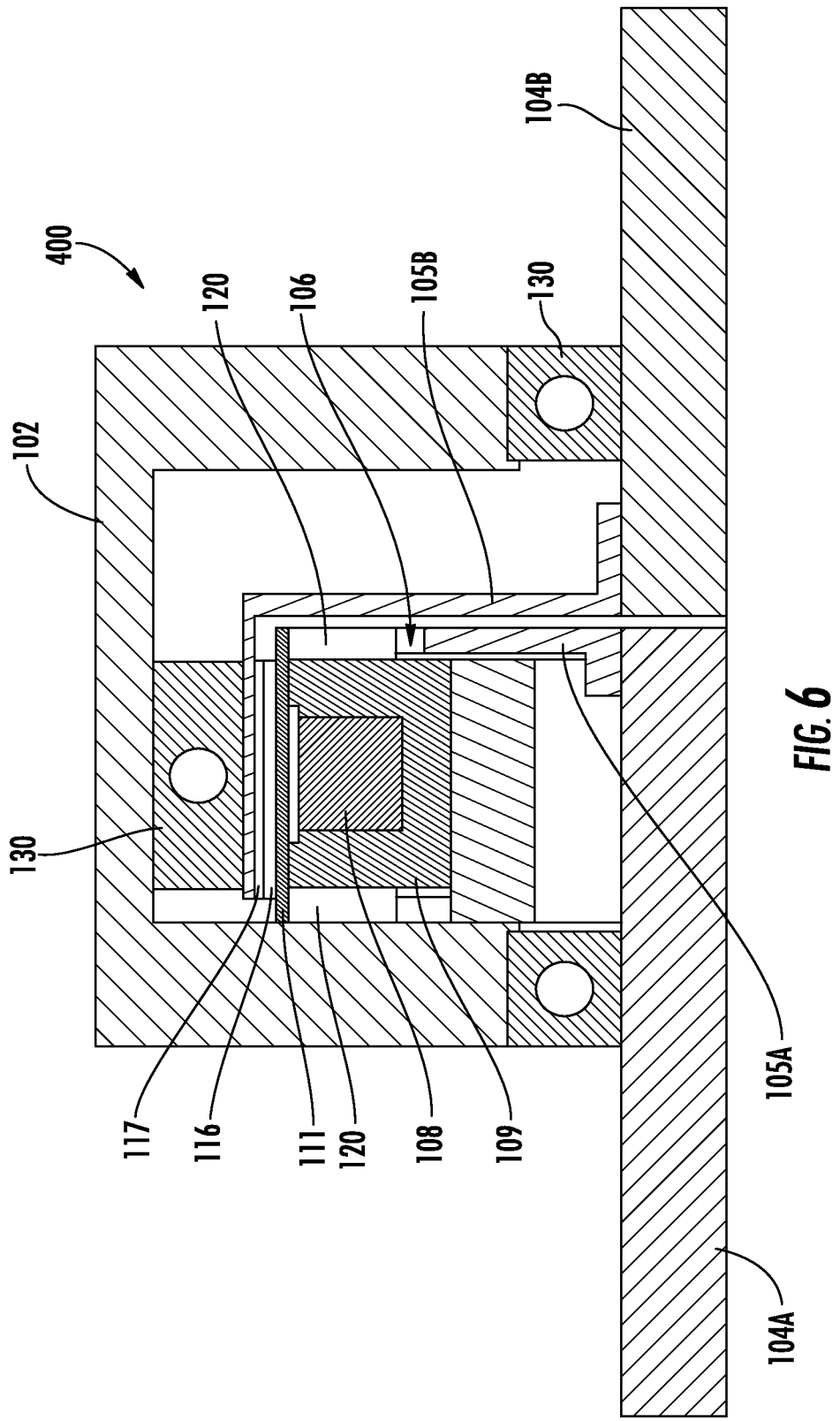
FIG. 6 is a sectional view of a dual action magnetic clutch brake according to an embodiment of the presently disclosed subject matter.

FIG. 6 is a first embodiment of a clutch brake, generally designated 400. The clutch brake comprises, consists, or consists essentially of a frame or housing 102, a driven shaft 104A, a drive shaft 104B, and a magnetic coil assembly. The drive shaft 104B can be attached to a mechanical input rotating the shaft. A portion of each shaft is partially disposed in the housing 102 and a portion of each shaft extends outwardly from the housing 102.

A magnetic coil assembly is disposed in the housing 102 around portions of the drive and/or driven shafts. Such an assembly comprises, consists, or consists essentially of a coil 108 and a braking member 110 disposed proximate to the coil. In some cases, the braking member 110 is directly adjacent to the coil 108. Alternatively, the braking member 110 can be spaced apart from the coil 108, with one or more optional intervening layers or members being disposed therebetween.

The coil 108 generates a magnetic field upon passing electrical current therethrough. The magnetic field moves, or induces movement, in the braking member 110 and/or one or more flexible members 120 attached to the braking member 110. The magnetic field can move the braking member 110 closer or further away from the coil 108, as desired, to facilitate substantially instantaneous and on-demand braking of the driven shaft 104A.

As FIG. 6 further illustrates, a driven disc 105A is fixedly disposed on or over the driven shaft 104A. Similarly, a second drive disc 105B is fixedly disposed on or over the drive shaft 104B. A first high-friction member or material 116 is disposed on the braking member 110. A second high-friction member or material 117 is disposed on the drive disc 105B. The high-friction materials 116 and 117 can comprise any suitable material by which the braking member 110 and the drive disc 105B can engage and grip each other to facilitate coupling of the driven shaft 105A and the drive shaft 105B, respectively, so that the drive and driven discs and shafts can simultaneously rotate together when the coil 108 is in the off-state. In the off-state, the flexible members 120 are in a decompressed state which urges the braking member 110 towards the drive disc 105B and facilitates coupling therebetween as illustrated in FIG. 6.

In the on-state, the coil 108 of the clutch brake generates a magnetic field that attracts the braking member 110 towards the coil 108. The force of the magnetic field urges or pulls the braking member 110 away from the drive disc 105B and compresses the flexible members 120. Thus, a braking force is applied to the driven disc 105A and shaft 104A. In the on-state, the braking member 110 disengages from the drive components and holds the driven shaft 104A in a non-rotating, stationary position. As in previous embodiments, the clutch brake can incorporate one or more bearing assemblies 130 to reduce friction and wear during use. The brake 400 is a dual action brake by torque being transmitted to the driven shaft 104A in the off-state and a braking torque being transmitted to the driven shaft 104A in the on-state for braking the driven shaft 104A.

Figure 7:
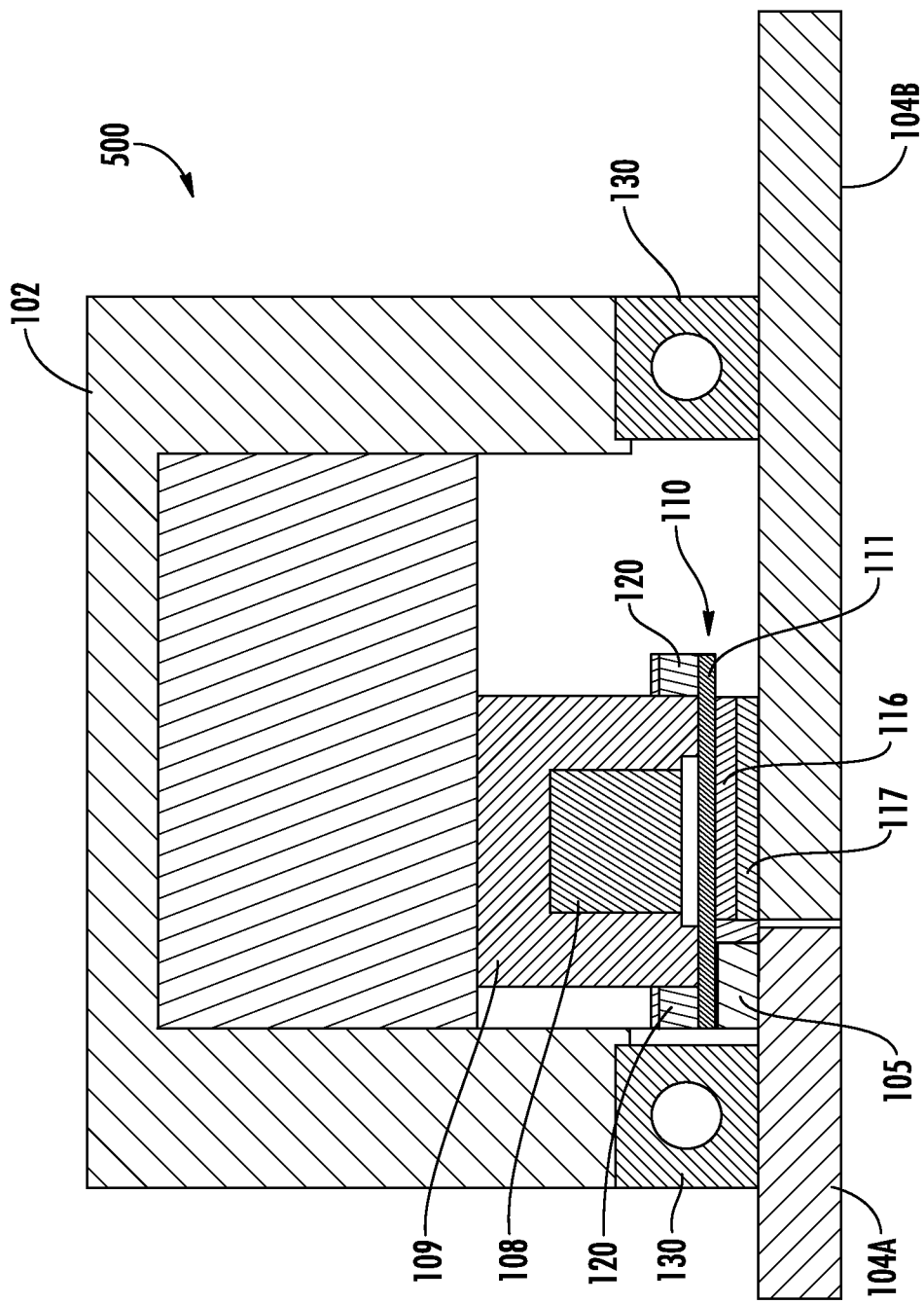
FIG. 7 is a sectional view of a dual action magnetic clutch brake according to an embodiment of the presently disclosed subject matter.

FIG. 7 is a further embodiment of a clutch brake, generally designated 500. In this embodiment, the bobbin 109 opens and faces towards the shafts 104A and 104B whereas in the previous clutch brake the bobbin opens and faces away from the shafts. Any orientation of the coil 108 and/or the bobbin 109 can be provided in a dual action brake, such as a clutch brake, described herein. The shafts can, but do not have to, be disposed in an end-to-end arrangement.

In additional embodiments, the clutch brake 500 comprises, consists, or consists essentially of a frame or housing 102, a plurality of shafts—including at least a driven shaft 104A and a drive shaft 104B—partially disposed in the housing, a coil 108 disposed in the housing, the coil being wound around portions of one or both of driven shaft 104A or drive shaft 104B, and a braking member 110. The braking member 110 is disposed proximate to the coil 108, for example and in some embodiments, the braking member 110 is disposed adjacent to the coil 108. In some embodiments, a sleeve of material 107 is disposed on or over outer surfaces of the coil 108, where desired, to optimize friction and wear between the coil 108 and the braking member 110.

In some embodiments, the braking member 110 is attached or coupled to one or more flexible members 120, which are biased in an contracted, decompressed state in the absence of a magnetic field. In this arrangement, in the off-state, this biasing of the flexible members 120 causes the braking member 110 to contract and engage drive shaft 104B, and the coupling of the braking member 110 with driven disc 105A as discussed above thereby couples the shafts for co-rotation. In the on-state, braking member 110 is drawn towards coil 108 and away from drive shaft 104B such that the shafts decouple. In addition, the engagement of the braking member 110 with the bobbin 109 inhibits the rotation of the braking member 110 as discussed above, and the driven shaft 104A is held stationary and non-rotating. In the on-state, the flexible members 120 compress as the braking member 110 moves towards and locks against the bobbin 109. As the braking member 110 moves, the flexible members 120 become compressed.

In some embodiments, the brake 500 further comprises a first high-friction material 116 disposed on or over the braking member 110. A second high-friction material 117 is disposed on or over the drive shaft 104B that opposes the braking member 110. The high-friction materials can comprise, for example and without limitation, a polymeric material, an elastic material, rubber, an adhesive material, a gripping or sticking material, etc. In the off-state, the high-friction materials 116 and 117 engage and couple the braking member 110 to the drive and driven shafts.

In some embodiments, the coil 108 is fixedly attached to the housing, or a portion thereof, via a bobbin 109. In the illustrated embodiment, the coil 108 is positioned towards or facing the respective driven and drive shafts 104A, 104B. In some embodiments, the drive shaft 104B is attached to a mechanical input and transmits torque to the driven shaft 104A when the coil is in the off-state. In the on-state, the braking member 110 radially contracts towards the driven shaft 104A to lock the shaft 104A in place. During contraction of the braking member 110, the high-frictional materials 116 and 117 grip and frictionally engage to stop and hold the shaft 104A. In the off-state, the braking member 110 radially expands towards the coil 108 causing the drive and driven shafts 104A and 104B to decouple. The driven shaft 104A is held stationary as the band engages the shaft disc 105, such as via frictionally engaging a groove of the disc 105.

Figure 8A:
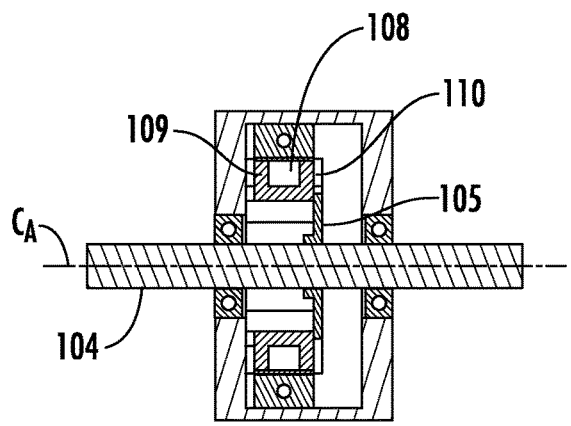
FIGS. 8A-8D are side-by-side views comparing the brakes in FIGS. 4A-7 according to embodiments of the presently disclosed subject matter.

FIGS. 8A-8D are side-by-side views comparing the respective brakes in FIGS. 4A-7. Such brakes can include, without limitation, non-clutch brakes and clutch brakes as set forth herein. As FIG. 8A illustrates, the coil 108 is disposed inside the braking member 110, and faces away from the shaft 104 and central axis CA of the brake 200. The coil is supported by the bobbin 109, which opens facing away from the shaft 104 and central axis CA of the brake 200. In this embodiment, the magnetic field generated via the coil 108 attracts the braking member 110 to facilitate braking.

Figure 8B:
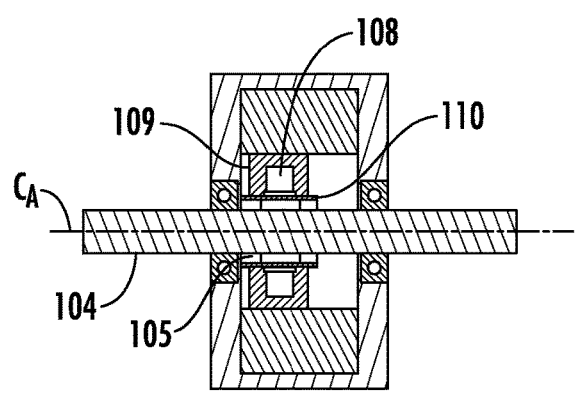

As FIG. 8B illustrates, the coil 108 is disposed outside of the braking member 110, and faces the shaft 104 as well as the central axis CA of the brake 300. The coil 108 is supported by the bobbin 109, which opens facing the shaft 104 and central axis CA of the brake 300. In this embodiment, the magnetic field generated via the coil 108 attracts the braking member 110 to facilitate braking vial locking the braking member 110, shaft 104, and disc 105 against the bobbin 109.

Figure 8C:
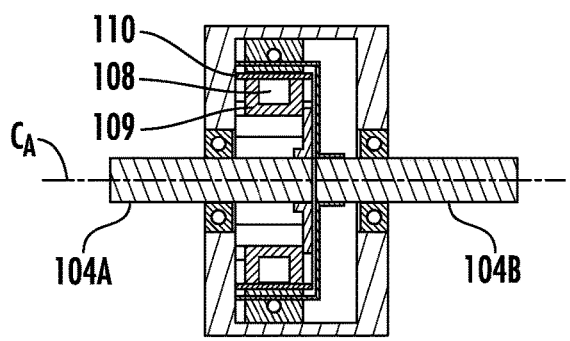

As FIG. 8C illustrates, the coil 108 is disposed inside the braking member 110, and faces away from the drives shaft 104A, driven shaft 104B, and central axis CA of the brake 400. The coil 108 is supported by the bobbin 109, which opens facing away from the driven shaft 104A and central axis CA of the brake 400. In this embodiment, the magnetic field generated via the coil 108 attracts the braking member 110 to facilitate non-rotation or braking of the driven shaft 104A.

Figure 8D:
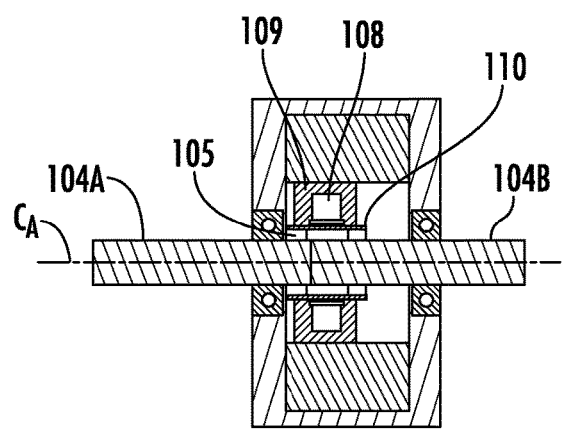

As FIG. 8D illustrates, the coil 108 is disposed outside of the braking member 110, and faces the driven shaft 104A, drive shaft 104B, and central axis CA of the brake 500. The coil 108 is supported by the bobbin 109, which opens facing the drive shaft 104B and central axis CA of the brake 500. In this embodiment, the magnetic field generated via the coil 108 attracts the braking member 110 to facilitate non-rotation or braking of the driven shaft 104A.

Figure 9:
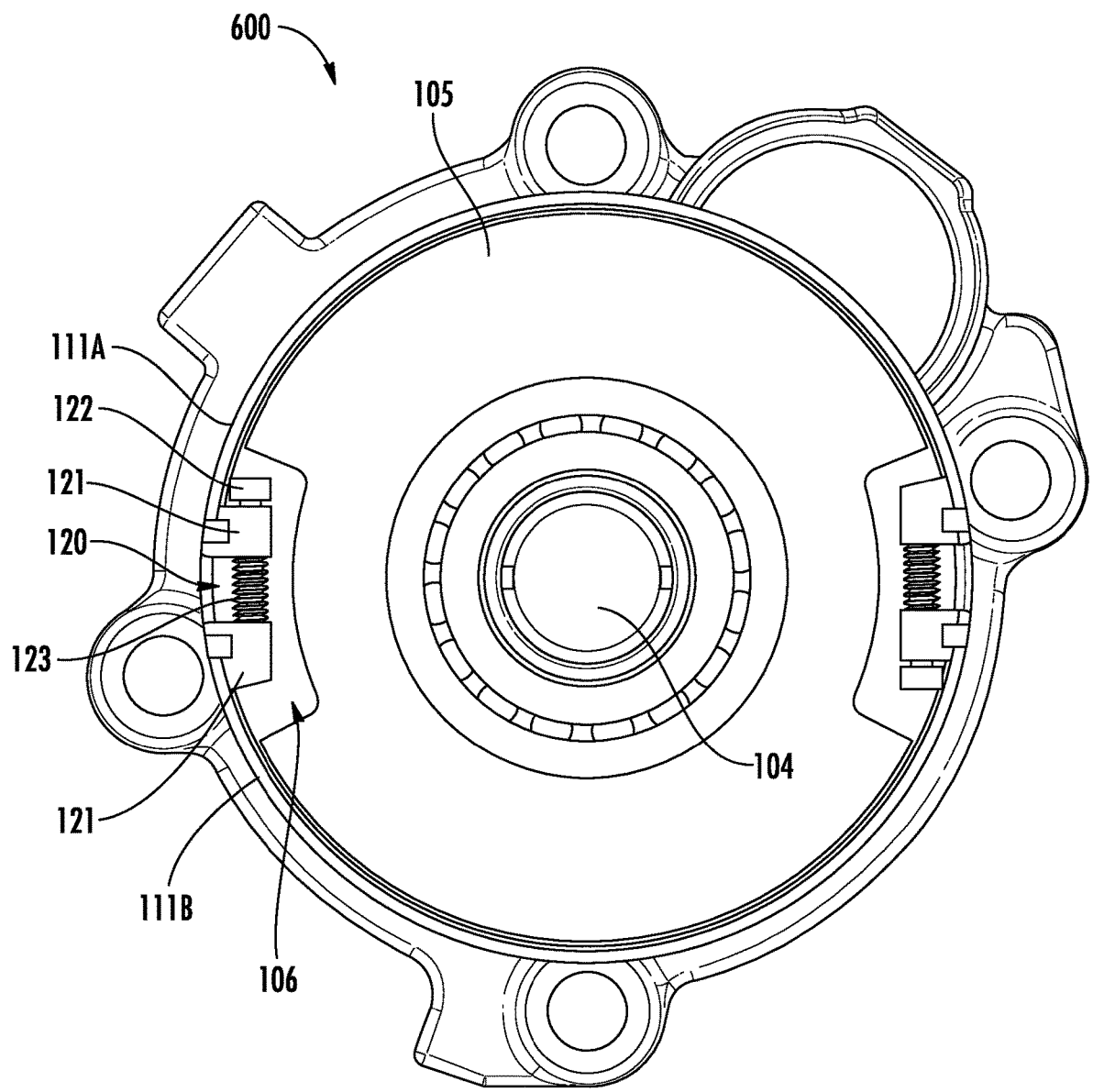
FIGS. 9 and 10 are a top view and side perspective view of a dual action magnetic brake according to embodiments of the presently disclosed subject matter.
Figure 10:
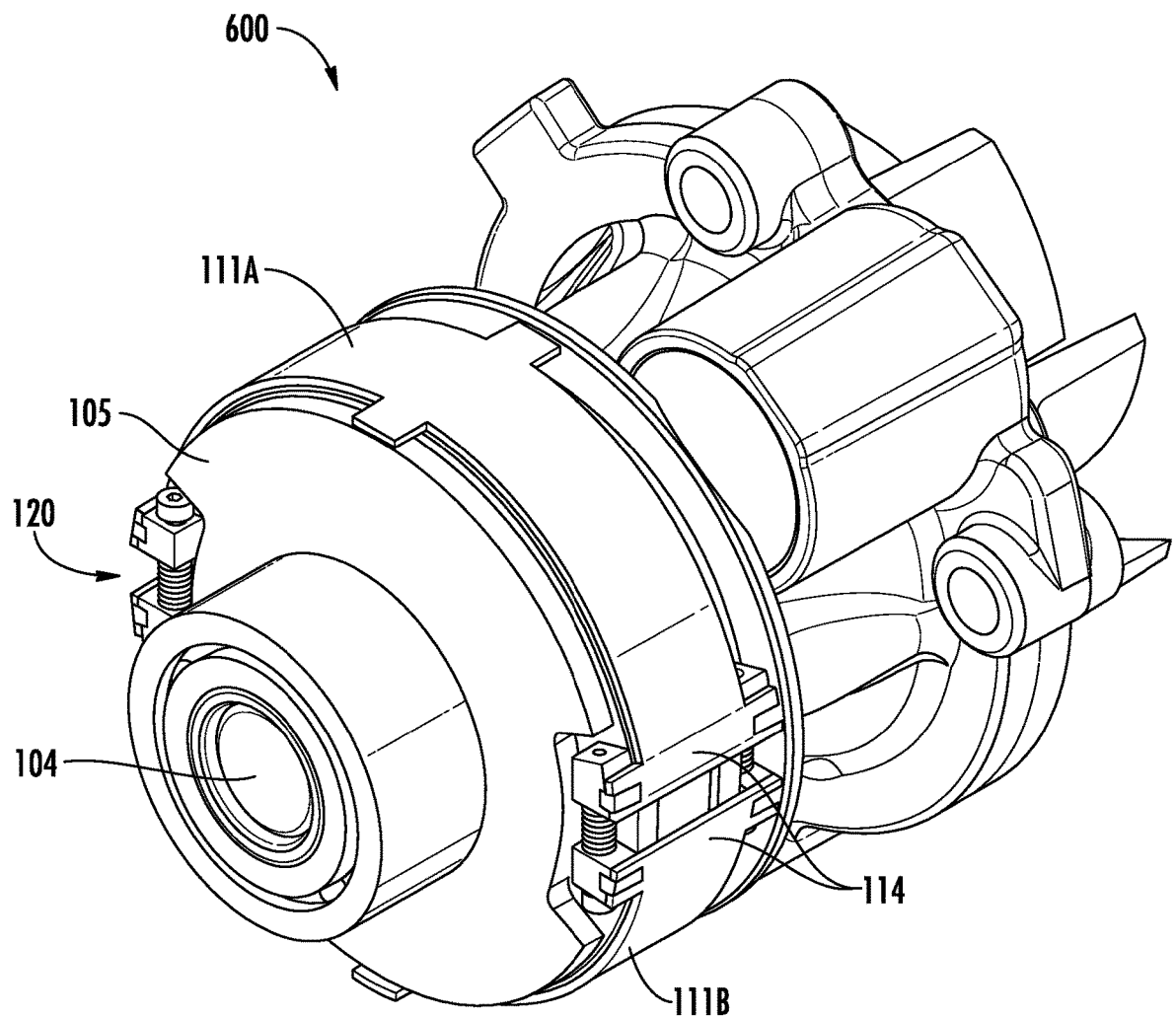

FIGS. 9 and 10 illustrate a further embodiment of a dual action magnetic brake, generally designated 600, in which a braking member 110 includes a plurality of partial band portions that are coupled together. In the embodiment illustrated in FIGS. 9 and 10, the braking member 110 comprises a first band portion 111A and a second band portion 111B that are coupled by two flexible members 120. In this embodiment, the braking member 110 act in a manner similar to the operation of the braking member 110 in the embodiments discussed above, wherein energizing an associated electromagnetic element generates a magnetic field to selectively expand or contract the braking member 110, such as by moving the first band portion 110A and the second band portion 110B either away from or towards each other, to engage the electromagnetic element and inhibit rotation of a shaft 104 to which the braking member 110 is coupled. When the magnetic field is removed, the braking member 110 is released from the electromagnetic element, and the flexible members 120 facilitate this release to disengage the braking member 110 from the electromagnetic element and allow the shaft 104 to rotate.

In the embodiment illustrated in FIGS. 9 and 10, an alternative configuration for the flexible members 120 is shown. In some embodiments, the flexible members 120 include a pair of lugs 121 that are attached to, integrated with, or otherwise coupled to the ends of first band portion 111A and the second band portion 111B, such as at tabs 114 that extend from ends of the first band portion 111A and a second band portion 111B. The lugs 121 are coupled together by a set screw 122 and a spring 123 that is wound around a portion of the set screw 122 that extends between the lugs 121. Disc 105 that is coupled to shaft 104 includes a plurality of pockets, sleeves, recesses, slots, grooves, or gaps 106 to accommodate each flexible member 120. In some embodiments, the pockets 106 are asymmetrically shaped to allow space for the head of the set screw 122 of the corresponding flexible member 120 and/or to adjust the impact timing during transitions to engaged and disengaged states of the braking member 110. In any configuration, the disk 105 and the braking member 110 are coupled for rotation together, such as by the contact, abutment, retention, or other engagement of the opposing edges of the pocket 106 with the tabs 114 of the first band portion 111A and a second band portion 111B and/or with the lugs 121 of the flexible members 120.

In embodiments in which the braking member 110 is disposed around the electromagnetic element, energizing the electromagnetic element causes the first band portion 111A and the second band portion 111B to move inwardly toward each other, which draws the lugs 121 of each pair towards each other and compresses the spring 123. Disengaging the electromagnetic element releases the first band portion 111A and the second band portion 111B, and the bias of the spring 123 is configured to push the lugs 121 apart to facilitate this release. Alternatively, in embodiments in which the electromagnetic element is disposed around the braking member 110, energizing the electromagnetic element causes the first band portion 111A and the second band portion 111B to move outwardly away from each other, which pulls the lugs 121 of each pair apart and extends the spring 123. Disengaging the electromagnetic element releases the first band portion 111A and the second band portion 111B, and the bias of the spring 123 is configured to pull the lugs 121 together to facilitate this release.

The dual action clutch brakes described herein are operable via generation of an electromagnetic field which attracts a braking member and inhibits rotation of the shaft 104 and disc 105 attached to the shaft 104 for holding a working implement stationary. It is recognized that the figures and embodiments described herein are merely illustrative of the concepts, principles, and/or functionality of the instant subject matter. Numerous modifications and adaptations will be readily apparent to those of skill in the art without departing from the subject matter disclosed herein. For example, and in some aspects, portions of the dual action brakes may be integrated or combined, where desired, without deviating from the instant subject matter.

III. Methods of Braking

In a further aspect, methods of inhibiting rotation or applying a braking force to a shaft are also disclosed. Such methods can utilize any of the components described and set forth in Sections I and II above. Briefly, a method of applying a braking force to a shaft comprises extending a rotatable shaft through a housing, disposing a braking member in the housing around portions of the shaft, disposing a coil adjacent to the braking member, and energizing the coil with electrical current to generate a magnetic field. In some embodiments, the braking member comprises one or more flexible members that are biased in a decompressed state. Energizing the coil generates a magnetic field that attracts the braking member to compress the flexible members and inhibit rotation of the shaft.

In some embodiments, energizing the coil generates a magnetic field that causes the braking member to move towards the coil. In some embodiments, energizing the coil can generate a magnetic field that causes the braking member to expand towards or contract towards the coil, depending on the orientation of the bobbin. The methods described herein can be applied via braking devices comprise of one, two, or more than two shafts. Such methods can inhibit co-rotation of the shafts, and inhibit rotation in at least one shaft.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. A dual action magnetic brake comprising:
a rotatable first shaft;
a rotatable second shaft that is disposed end-to end relative to the first shaft;
a coil fixedly attached to a housing and disposed around portions of the first shaft, the coil being configured to generate a magnetic field when energized with electrical current; and
a braking member disposed proximate to the coil and coupled to the first shaft for rotation together with the first shaft, wherein the braking member comprises one or more band portions each having a first end and a second end, wherein the one or more band portions are positioned about the first shaft in an annular arrangement in which the first end of one of the one or more band portions is spaced apart from the second end of an adjacent one of the one or more band portions by a gap, and wherein the first end of the one of the one or more band portions and the second end of the adjacent one of the one or more band portions are coupled via one or more flexible members, and
wherein the braking member and the one or more flexible members are moveable in response to the presence or absence of the magnetic field to selectively decouple or couple the braking member with the coil to facilitate rotation or non-rotation of the first shaft, respectively;
wherein the one or more flexible members and a stiffness of the braking member are together configured to apply a biasing force to control a size of the gap to change an effective diameter of the braking member in the absence of the magnetic field; and
wherein the first shaft and the second shaft are co-rotatable in the absence of the magnetic field.

2. The brake of claim 1, wherein the braking member is configured to radially contract in the presence of the magnetic field and radially expand in the absence of the magnetic field.

3. The brake of claim 1, wherein the braking member is configured to radially expand in the presence of the magnetic field and radially contract in the absence of the magnetic field.

4. The brake of claim 1, wherein the coil is wound around a bobbin comprising a ferromagnetic material.

5. The brake of claim 1, wherein the one or more flexible members are compressed in the presence of the magnetic field and decompressed in the absence of the magnetic field.

6. The brake of claim 5, wherein the first shaft is rotatable when the one or more flexible members are decompressed and non-rotatable when the one or more flexible members are compressed.

7. The brake of claim 1, wherein the braking member is positioned directly adjacent to the coil.

8. The brake of claim 1, wherein the one or more flexible members comprise a plurality of flexible members that extend across each gap between the first end of the one of the one or more band portions and the second end of the adjacent one of the one or more band portions.

9. The brake of claim 8, wherein, in the absence of the magnetic field, the one or more flexible members are biased in an extended state to enlarge each gap between the first and second ends of the one or more band portions.

10. The brake of claim 1, wherein the first shaft is stationary in the presence of the magnetic field.

11. The brake of claim 1, wherein a first high-friction member or material is disposed on the braking member.

12. The brake of claim 11, wherein a second high-friction member or material is disposed on the second shaft.

13. A rotating object comprising the brake of claim 1.

14. A transmission, pump, fan, compressor, or drill comprising the brake of claim 1.

15. A method of applying a braking force to a shaft that is rotatable, the method comprising:
- disposing a braking member around portions of the shaft, wherein the braking member comprises one or more band portions each having a first end and a second end, wherein the one or more band portions are positioned about the shaft in an annular arrangement in which the first end of one of the one or more band portions is spaced apart from the second end of an adjacent one of the one or more band portions by a gap, and wherein the first end of the one of the one or more band portions and the second end of the adjacent one of the one or more band portions are coupled via one or more flexible members that are biased in a decompressed state;
- coupling the braking member to the shaft for rotation together;
- disposing a coil adjacent to the braking member and fixedly attaching the coil to a housing;
- rotating the shaft when the flexible members are in the decompressed state, wherein the one or more flexible members and a stiffness of the braking member together apply a biasing force to control a size of the gap to change an effective diameter of the braking member in the absence of the magnetic field;
- energizing the coil with electrical current to generate a magnetic field, wherein energizing the coil with electrical current moves the braking member and compresses the flexible members to inhibit rotation of the shaft; and
- disposing a drive shaft adjacent to the rotatable shaft and co-rotating the shafts when the flexible members are in the decompressed state.

16. The method of claim 15 further comprising, in response to energizing the coil, moving the braking member towards the coil.

17. The method of claim 15 further comprising, in response to energizing the coil, expanding or contracting the braking member towards the coil.

* * * * *